US010755442B2

(12) United States Patent
Lu et al.

(10) Patent No.: US 10,755,442 B2
(45) Date of Patent: *Aug. 25, 2020

(54) OIL LEAKAGE DETECTOR AND OIL LEAKAGE DETECTION METHOD AND IMAGE PROCESSING UNIT

(71) Applicant: Hitachi, Ltd., Chiyoda-ku, Tokyo (JP)

(72) Inventors: Li Lu, Tokyo (JP); Satoshi Ichimura, Tokyo (JP); Tomohiro Moriyama, Tokyo (JP); Jun Nukaga, Tokyo (JP); Toshiaki Rokunohe, Tokyo (JP); Akira Yamagishi, Tokyo (JP); Yasutomo Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/869,508

(22) Filed: Jan. 12, 2018

(65) Prior Publication Data

US 2018/0137652 A1 May 17, 2018

Related U.S. Application Data

(63) Continuation of application No. 15/053,294, filed on Feb. 25, 2016, now Pat. No. 9,898,830.

(30) Foreign Application Priority Data

Mar. 17, 2015 (JP) .................. 2015-053117

(51) Int. Cl.
*G06T 7/40* (2017.01)
*H04N 9/04* (2006.01)
(Continued)

(52) U.S. Cl.
CPC .................. *G06T 7/90* (2017.01); *G01V 8/00* (2013.01); *G06T 7/0004* (2013.01); *G06T 7/136* (2017.01);
(Continued)

(58) Field of Classification Search
None
See application file for complete search history.

(56) References Cited

U.S. PATENT DOCUMENTS 5,974,860 A * 11/1999 Kuroda ................ G01M 3/38
73/40
9,898,830 B2 * 2/2018 Lu ........................ G06T 7/0004

FOREIGN PATENT DOCUMENTS

JP 6-273255 A 9/1994
JP 8-128916 A 5/1996
(Continued)

OTHER PUBLICATIONS

Japanese-language Office Action issued in counterpart Japanese Application No. 2015-053117 dated Jun. 26, 2018 with English translation (five (5) pages).

(Continued)

*Primary Examiner* — Dakshesh D Parikh
*Assistant Examiner* — Tyler B Edwards
(74) *Attorney, Agent, or Firm* — Crowell & Moring LLP

(57) ABSTRACT

An oil leakage detector of the present invention includes an image processing unit wherein the image processing unit calculates the values of saturation and intensity of each pixel in the color image of the object after an ultra-violet light is irradiated thereon, draws an intensity-saturation characteristic line of the saturation expressed in an X-axis and the intensity expressed in a Y-axis, sets an upper limit and a lower limit of intensity of each saturation as a threshold value based on an area without oil adhesion on the surface of the object, and determines, in the intensity-saturation characteristic line, an area corresponding to a pixel group where the intensity exceeds the threshold value of the upper (Continued)

limit and a pixel group where the intensity falls below the threshold value of the lower limit, to be an oil leakage adhered area.

20 Claims, 12 Drawing Sheets

(51) Int. Cl.
*G06T 7/00* (2017.01)
*G06T 7/90* (2017.01)
*G06T 7/136* (2017.01)
*G01V 8/00* (2006.01)

(52) U.S. Cl.
CPC .... *G06T 2207/10024* (2013.01); *H04N 9/045* (2013.01)

(56) References Cited

FOREIGN PATENT DOCUMENTS

| | | | |
|---|---|---|---|
| JP | 9-304281 A | | 11/1997 |
| JP | 2008-116389 A | | 5/2008 |
| JP | 2008116389 A | * | 5/2008 |
| JP | 2009-128260 A | | 6/2009 |
| JP | 2011-64526 A | | 3/2011 |
| JP | 2011-185757 A | | 9/2011 |
| JP | 2013-101474 A | | 5/2013 |

OTHER PUBLICATIONS

Japanese-language Office Action issued in Japanese Application No. 2019-071079 dated Mar. 31, 2020 with English translation (four (4) pages).

* cited by examiner

OIL LEAKAGE DETECTOR AND OIL LEAKAGE DETECTION METHOD AND IMAGE PROCESSING UNIT

CLAIM OF PRIORITY

The present application is a continuation of U.S. application Ser. No. 15/053,294 filed Feb. 25, 2016, which claims priority from Japanese Patent application no. 2015-053117, filed on Mar. 17, 2015, the contents of which are hereby incorporated by reference into this application.

BACKGROUND OF THE INVENTION

(1) Field of the Invention

The present invention relates to an oil leakage detector and an oil leakage detection method, and particularly to an oil leakage detector and an oil leakage detection method suitable for detection of an oil leakage in an oil-filled device such as a transformer, a condenser, a hydraulic operation device for GIS (gas insulated switchgear), a rectifier or the like.

(2) Description of the Related Art

There has heretofore been a concern for an oil storage tank or a transformer or the like to cause a leakage of oil (oil leakage) due to deterioration or an accident or the like. Since the oil leakage may lead to environment pollution and disasters, there has been a demand for a simple and highly-accurate detection technology in an early stage of the oil leakage.

As a related art technology for addressing this problem, there are known those described in Patent Documents 1 and 2.

Japanese Patent Application Laid-Open Publication No. 2008-116389 (Patent Document 1) describes that when ultra-violet light including an absorption wavelength of leakage oil is irradiated on an object to be measured from outside, fluorescence emitted from the leakage oil is detected, and that the accuracy of detection of fluorescence is enhanced by using a filter through which a visible light component of ultra-violet light (black light) does not pass, and a bandpass filter which allows the center wavelength of the fluorescence to pass therethrough.

Further, Japanese Patent Application Laid-Open Publication No. 2013-101474 (Patent Document 2) describes that the presence or absence of oil is determined based on the intensity of a predetermined specific color in colors at respective pixels of a color image of colored leakage oil.

In the technology described in Patent Document 1, however, the intensity of fluorescence which reaches a detector was reduced with the use of the bandpass filter. For example, it was difficult for the technology to detect a small amount of leakage oil adhered to the surface of a transformer. Further, the technology was accompanied by a problem that the structure of the detector was complicated when using an optical filter.

On the other hand, there has been a demand for the technology described in Patent Document 2 to establish a detection technology which is simple, e.g., filterless, and capable of also detecting a leakage of colorless oil because it is not possible to detect the colorless leakage oil.

The present invention has been made in view of the foregoing. An object of the present invention is to provide an oil leakage detector and an oil leakage detection method both high in detection accuracy, which are capable of also detecting colorless oil without complicating the oil leakage detector.

SUMMARY OF THE INVENTION

In order to address the above problems, an oil leakage detector of the present invention is provided which includes an ultra-violet light irradiated on an object to be measured, a color camera which photographs fluorescence from the object irradiated with the ultra-violet light, a control unit which controls operations of the ultra-violet light and the color camera, a recording unit which records an image of the object photographed by the color camera, an image processing unit which invokes the image recorded in the recording unit to determine an oil leakage, and a display unit which displays a result of determination by the image processing unit. The image processing unit calculates the values of saturation and intensity of each pixel in the color image photographed by the color camera and draws an intensity-saturation characteristic line of the saturation expressed in an X-axis and the intensity expressed in a Y-axis, sets an upper limit and a lower limit of intensity of each saturation as a threshold value based on an area without oil adhesion on the surface of the object, and determines, in the intensity-saturation characteristic line, an area corresponding to a pixel group where the intensity exceeds the threshold value of the upper limit and a pixel group where the intensity falls below the threshold value of the lower limit, to be an oil leakage adhered area.

Further, in order to address the above problems, an oil leakage detection method of the present invention is provided which comprises the steps of, when an oil leakage adhered area of an object to be measured is detected by an oil leakage detector including an ultra-violet light irradiated on the object, a color camera which photographs fluorescence from the object irradiated with the ultra-violet light, a control unit which controls operations of the ultra-violet light and the color camera, a recording unit which records an image of the object photographed by the color camera, an image processing unit which invokes the image recorded in the recording unit to determine an oil leakage, and a display unit which displays a result of determination by the image processing unit: calculating by the image processing unit, the values of saturation and intensity of each pixel in the color image photographed by the color camera for photographing the fluorescence from the object irradiated with the ultra-violet light; drawing an intensity-saturation characteristic line of the saturation expressed in an X-axis and the intensity expressed in a Y-axis; setting an upper limit and a lower limit of intensity of each saturation as a threshold value based on an area without oil adhesion on the surface of the object; and determining, based on the intensity-saturation characteristic line, an area corresponding to a pixel group where the intensity exceeds the threshold value of the upper limit and a pixel group where the intensity falls below the threshold value of the lower limit, to be an oil leakage adhered area by the image processing unit.

According to the present invention, an oil leakage detection high in detection accuracy, which makes it possible to also detect colorless oil, can be carried out without complicating a device.

DETAILED DESCRIPTION OF THE PREFERRED EMBODIMENTS

Figure 1:
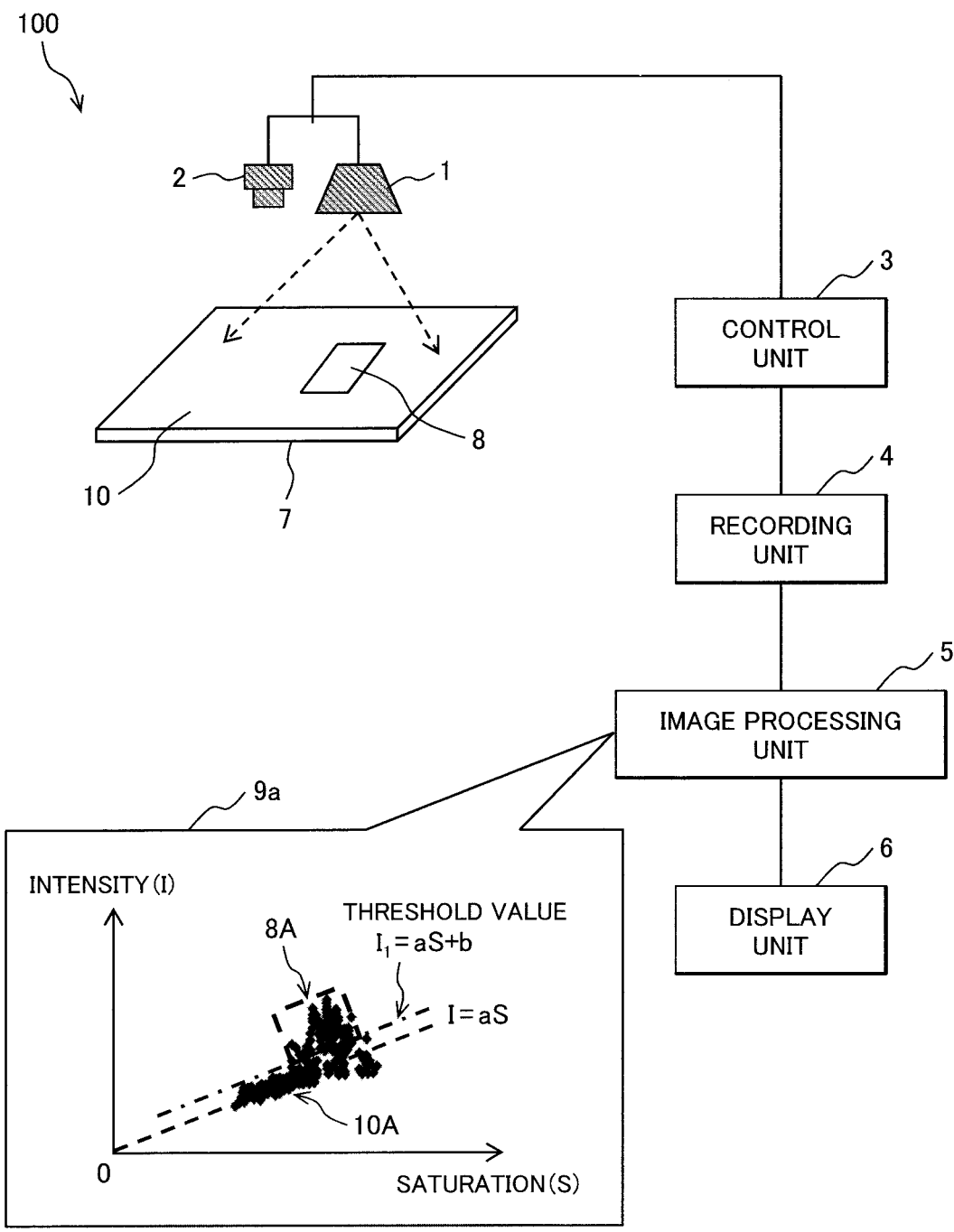
FIG. 1 is a schematic configuration view showing an embodiment 1 of an oil leakage detector of the present invention together with an intensity-saturation graph.

An oil leakage detector and an oil leakage detection method of the present invention will hereinafter be described based on illustrated embodiments. Incidentally, the same reference numerals are respectively used in the same components in the respective embodiments.

Embodiment 1

An embodiment 1 of an oil leakage detector of the present invention is shown in FIG. 1 together with an intensity-saturation graph.

As shown in the FIG. 1, the oil leakage detector 100 of the present embodiment is roughly comprised of an ultra-violet light 1 irradiated on an object 7 to be measured, a color camera 2 which photographs fluorescence from the measurement object 7 irradiated with the ultra-violet light 1, a control unit 3 which controls the operations of the ultra-violet light 1 and the color camera 2, a recording unit 4 which records an image of the measurement object 7 photographed by the color camera 2, an image processing unit 5 which invokes the image of the measurement object 7 recorded in the recording unit 4 to determine an oil leakage, and a display unit 6 which displays a result of determination by the image processing unit 5.

Further, in the present embodiment, the image processing unit 5 calculates the values of saturation and intensity of each pixel in the color image of the measurement object 7 photographed by the color camera 2 and draws an intensity-saturation characteristic line (intensity-saturation graph 9a) of the saturation expressed in an X-axis and the intensity expressed in a Y-axis. Further, the image processing unit 5 sets an upper limit and a lower limit of intensity of each saturation as a threshold value based on an area without oil adhesion on the surface of the object, and determines, based on the intensity-saturation characteristic line, an area corresponding to a pixel group where the Y-axis numeric value of an area without oil adhesion on the surface of the measurement object 7 exceeds a threshold value in the direction in which the value is large (that is, where the intensity exceeds the threshold value of the upper limit), or where the Y-axis numeric value of the area without oil adhesion on the surface of the measurement object 7 falls below a threshold value in the direction in which the value is small (that is, where the intensity falls below the threshold value of the lower limit), to be an leakage oil adhered area.

Specifically, though means for determining the area corresponding to the pixel group in the image processing unit 5 to be the leakage oil adhered area will be described in detail later, it determines, based on the intensity-saturation characteristic line (intensity-saturation graph 9a), an area corresponding to a pixel group exceeding a threshold value in the direction in which the numeric value of intensity is large (that is, where the intensity exceeds the threshold value of the upper limit), to be a leakage oil adhered area where R (Red), G (Green), and B (Blue) of each pixel indicative of the surface of the measurement object 7 photographed by the color camera 2 satisfies a condition of $R^2+G^2-BR-BG>0$, or determines, based on the intensity-saturation characteristic line, an area corresponding to a pixel group falling below a threshold value in the direction in which the numeric value of intensity is small (that is, where the intensity falls below the threshold value of the lower limit), to be a leakage oil adhered area where R, G, and B of the area of the measurement object 7 satisfies a condition of $R^2+G^2-BR-BG<0$.

Incidentally, the ultra-violet light 1 is a commercially available black light. Further, the color camera 2 is capable of outputting image data to the outside and may be, for example, a versatile one such as a color digital camera or the like which photographs visible light.

The present embodiment and embodiments 2 to 4 to be described below will next be made about the case where oil leakage detection of insulation oil generally used in an oil-filled transformer is performed by the oil leakage detector of the present invention, while taking as an example where the oil leakage detector of the present invention is applied to the oil-filled transformer.

A schematic configuration of the oil-filled transformer will first be described using FIGS. 2 and 3.

In the drawings, reference numeral 15 is a tank of the transformer. A main body of the transformer comprised of an iron core and windings is stored within the tank 15 together with insulation oil. The main body of the transformer and a bushing 14 in the tank 15 are connected to each other. The tank 15 is connected to a radiator 16 through an upper pipe 17a and a bottom pipe 17b. Pipes on the tank 15 side and pipes on the radiator 16 side are respectively connected by a junction part (flange) 18*a* of the upper pipe 17*a* and a junction part (flange) 18*b* of the bottom pipe 17*b*.

The oil-filled transformer having such a configuration, which is generally used in a power facility, has a structure in which the bushing 14, the tank 15, the radiator 16, the upper pipe 17*a* and the bottom pipe 17*b* are filled with the insulation oil. The junction part (flange) 18*a* of the upper pipe 17*a* and the junction part (flange) 18*b* of the bottom pipe 17*b* are generally respectively fixed with bolts and nuts through packings.

Figure 2:
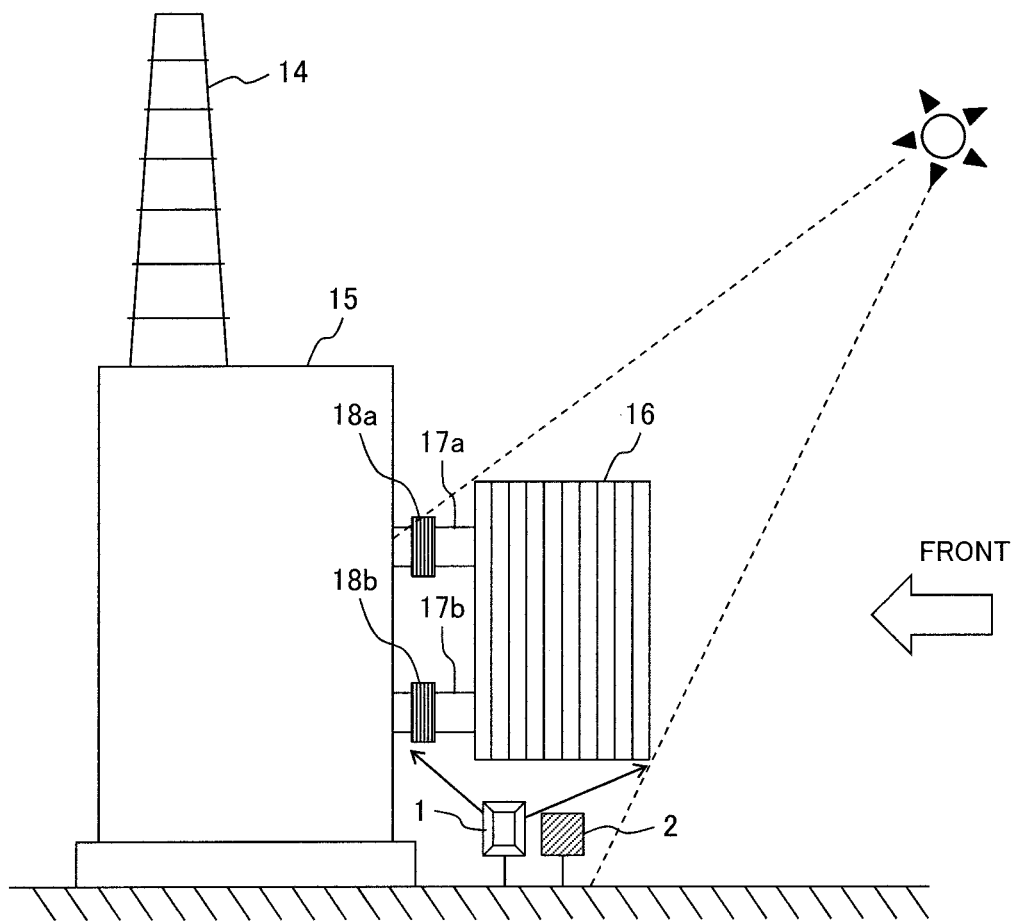
FIG. 2 is a side view showing an oil-filled transformer to which the oil leakage detector of the present invention is applied.
Figure 3:
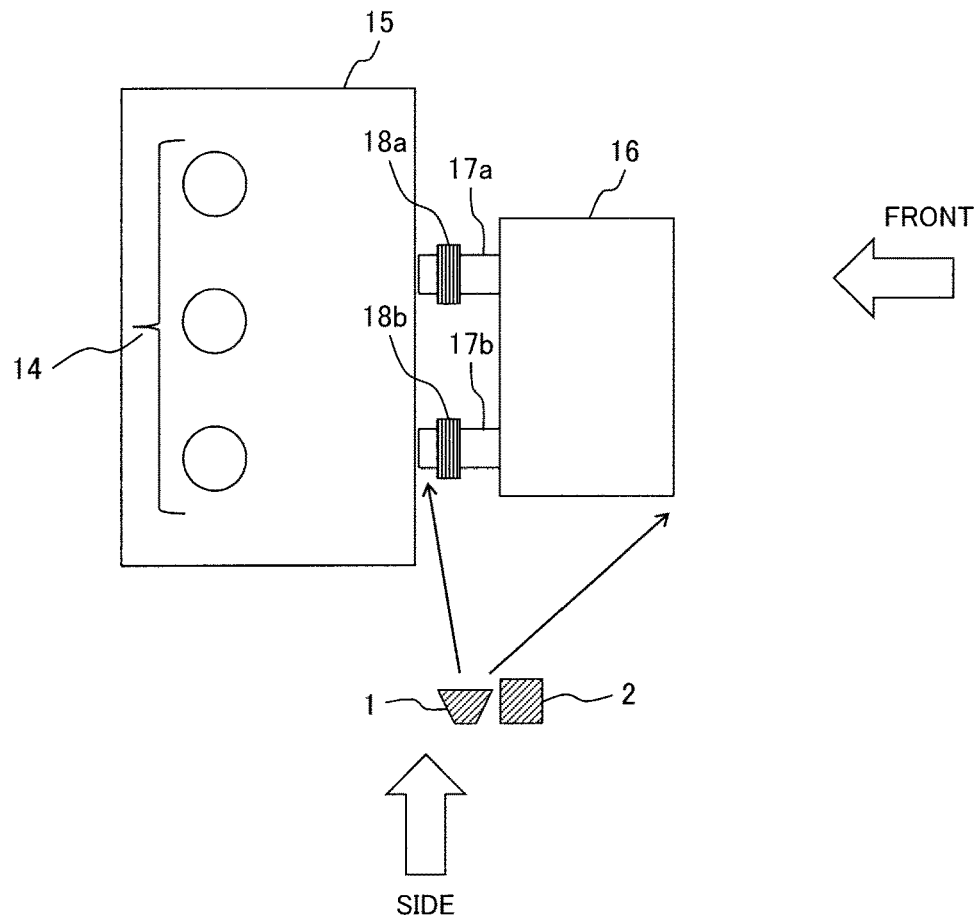
FIG. 3 is a plan view of FIG. 2.

The example illustrated in FIGS. 2 and 3 is intended to detect leakage oil from the radiator 16 and the junction part 18*b* of the bottom pipe 17*b* in the oil-filled transformer by using the oil leakage detector of the present invention (the ultra-violet light 1 and the color camera 2 in the oil leakage detector of the present invention are illustrated in FIGS. 2 and 3). Incidentally, the present invention can be applied even to the oil leakage detection of the whole oil-filled devices and is not limited to the oil-filled transformer.

In general, when the insulation oil is irradiated with the ultra-violet light 1, fluorescence is emitted. The black light used as the ultra-violet light 1 includes a visible light component of 380 nm or more in addition to an ultra-violet component. The visible light or visible light around the measurement object 7 is reflected when applied onto the surface of the measurement object 7, and the reflected light is photographed by the color camera 2. The reflection at this time is basically diffusion reflection except for the case where the surface of the measurement object 7 is a mirror surface.

The saturation (S) and intensity (I) of each pixel is calculated by the image processing unit 5, using the values of R (Red), G (Green), and B (Blue) of each pixel indicative of the surface of the measurement object 7 in the image photographed by the color camera 2.

As calculation equations of the saturation (S) and the intensity (I), there are, for example, generally-known equations 1 and 2.

$$\text{Saturation }(S) = \sqrt{R^2 + G^2 + B^2 - GR - BR - GB} \qquad 1$$

$$\text{Intensity }(I) = \frac{1}{3}R + \frac{1}{3}G + \frac{1}{3}B \qquad 2$$

An intensity-saturation graph 9*a* is created with the intensity (I) of each pixel as a Y-axis and the saturation (S) thereof as an X-axis.

As shown in the intensity-saturation graph 9*a* of FIG. 1, when the reflection of an area 10 without oil adhesion on the surface of the measurement object 7 is of diffusion reflection, the relationship between the saturation (S) and the intensity (I) follows the following equation 3:

$$I = aS = \frac{\frac{1}{3}R_0 + \frac{1}{3}G_0 + \frac{1}{3}B_0}{\sqrt{R_0^2 + G_0^2 + B_0^2 - G_0R_0 - B_0R_0 - G_0B_0}} S \qquad 3$$

where a is a constant, and $R_0$, $B_0$, and $G_0$ are the values of R, G, and B at a given area in the area 10 without oil adhesion on the surface of the measurement object 7. The surface color of the measurement object 7 and incident light irradiated on the measurement object 7 are constant, the saturation (S) and the intensity (I) change while keeping a proportional relation of the equation 3, according to changes in irradiation light of a point on the surface of the measurement object 7 and a photographing angle to the color camera 2. This relation is generally known.

Further, the value of the intensity (I) varies on the straight line of the equation 3 at the same saturation due to the surface roughness of the area 10 without oil adhesion on the surface of the measurement object 7, and ununiformity in spatial distribution of the incident light.

When the ultra-violet light 1 is applied to the insulation oil, a blue fluorescence having a center wavelength of 405 nm is emitted. When the value of K defined by a following equation 4 using the values $R_0$, $B_0$, and $G_0$ of R, G, and B of the area 10 without oil adhesion on the surface of the measurement object 7 is K>0 where only the component of B after oil adhesion is considered to increase as compared with when no leakage oil is adhered to the leakage oil adhered area 8, the intensity (I) of the leakage oil adhered area 8 becomes larger than the straight line of the equation 3. When K<0, the intensity (I) of the leakage oil adhered area 8 becomes smaller than the straight line of the equation 3.

$$K = R_0^2 + G_0^2 - B_0 R_0 - B_0 G_0 \qquad 4$$

The intensity-saturation graph 9*a* shown in FIG. 1 shows where K>0. In the case of K>0, a threshold value $I_1 = aS + b$ is set to a value larger than the maximum value of the values of intensity to respective saturations (S) of a pixel group 10A corresponding to the area 10 without oil adhesion on the surface of the measurement object 7 in parallel with the straight line of the equation 3. A pixel group 8A exceeding from the threshold value $I_1$ is determined to be the leakage oil adhered area 8. Since the leakage oil is adhered to the measurement object 7, it is affected by the reflection of the leakage oil adhered area (pixel group 8A), and changes in the values of saturation (S) and intensity (I) are influenced by even the film thickness of the oil. Therefore, there occurs a case where variations in the saturation (S) and intensity (I) of the pixel group 8A appear.

Incidentally, when K<0, a threshold value $I_2 = aS + b'$ is set to a value smaller than the minimum value of the values of intensity to the respective saturations (S) of the pixel group 10A corresponding to the area 10 without oil adhesion on the surface of the measurement object 7 in parallel with the straight line of the equation 3. A pixel group 8A which falls below the threshold value $I_2$ is determined to be the leakage oil adhered area 8.

With the provision of such a present embodiment, it is possible to carry out oil leakage detection high in detection accuracy, which makes it possible to also detect colorless oil without complicating the device.

Embodiment 2

Figure 4:
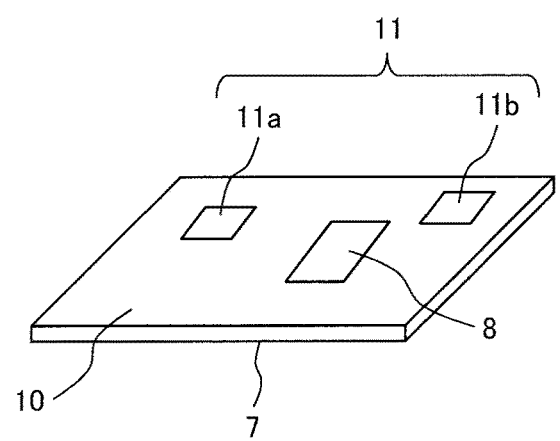
FIG. 4 is a perspective view showing an object to be measured adopted in an embodiment 2 of the oil leakage detector of the present invention.

FIG. 4 shows an object 7 to be measured adopted in an embodiment 2 of the oil leakage detector of the present invention. Incidentally, in the present embodiment, the same reference numerals are respectively attached to the same elements as in the embodiment 1, and the description thereof will be omitted. A description will be made about only different parts. Further, since the control unit 3, the recording unit 4, the image processing unit 5, and the display unit 6 are the same as those in the embodiment 1 shown in FIG. 1, their description will be omitted.

In the present embodiment, an area 11 without oil adhesion in any case is set to the surface of the measurement object 7 in advance. The area 11 without oil adhesion in any case is prepared, for example, by setting a cover, seal, or the like on the surface of the object to be measured 7 and removing them at the oil leakage detecting. As described in the embodiment 1, the saturation and intensity values of each point of the surface of the measurement object 7 depend on the incident light, the photographing angle, and the state of the surface of the measurement object 7, etc. Therefore, the area 11 may preferably be set to the surface of the measurement object 7 as areas 11a and 11b without oil adhesion in any case in plural form at places where they are away from each other, or set to a surface area having the area of such a degree as to include the plural areas 11a and 11b without oil adhesion in any case, which are away from each other.

Figure 5:
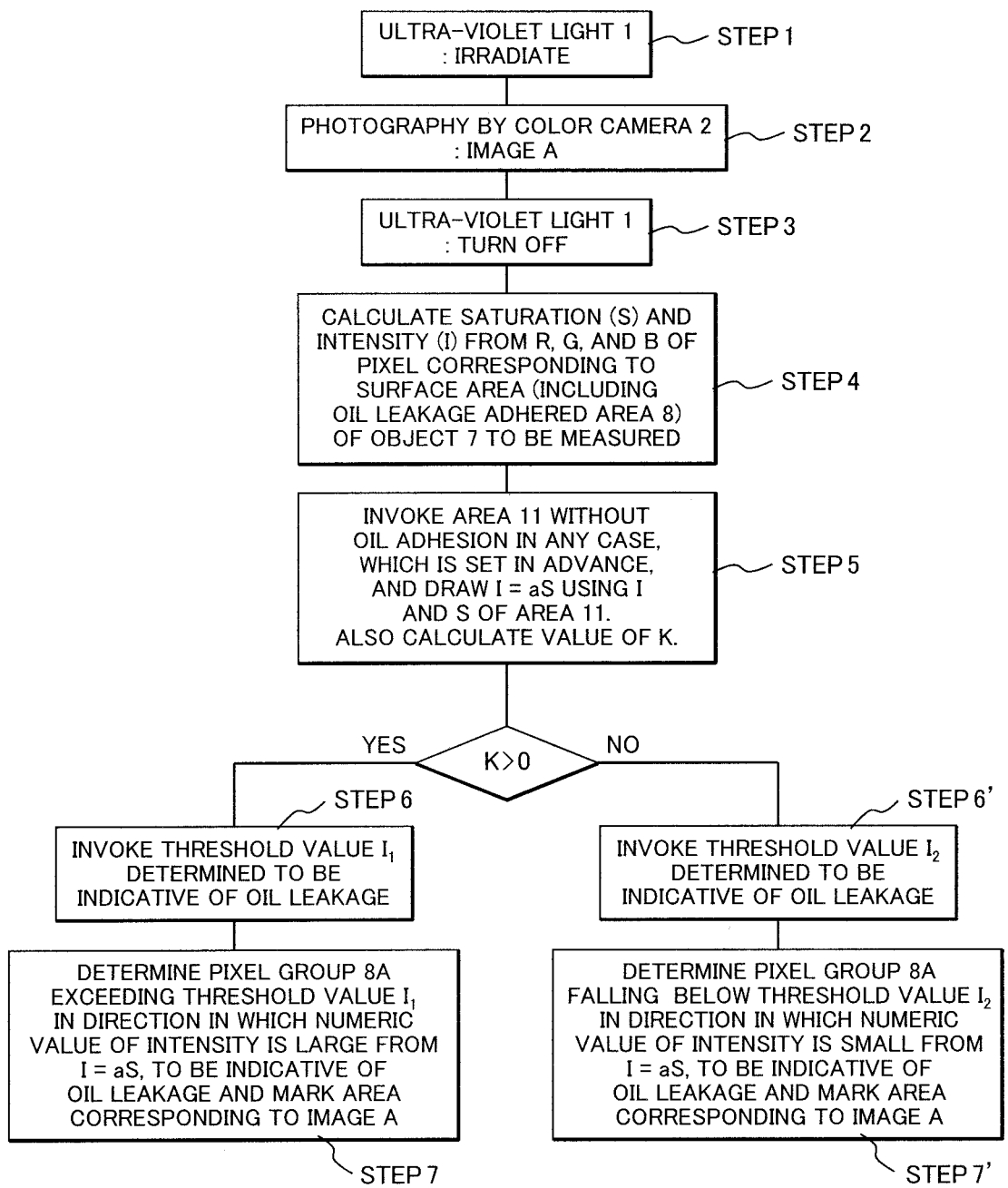
FIG. 5 is a flowchart for describing an oil leakage detecting operation in the embodiment 2 of the oil leakage detector of the present invention.

FIG. 5 is a flowchart when the oil leakage detector of the present embodiment automatically detects a leakage oil adhered area 8. The operation of the oil leakage detector of the present embodiment will be described in detail below using FIG. 5.

Figure 6A:
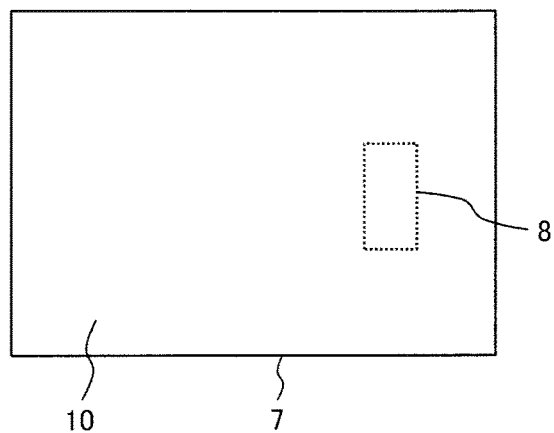
FIG. 6A is a schematic view showing an image photographed in the embodiment 2 of the oil leakage detector of the present invention.

First, in STEP1, the ultra-violet light 1 is applied to the measurement object 7. In STEP2, an image A obtained by photographing it with the color camera 2 is stored in the recording unit 4. One example of the image A is illustrated in FIG. 6A.

In STEP3, the ultra-violet light 1 is turned off. In STEP4, the image processing unit 5 calculates the saturation and intensity from R, G, and B of each pixel of the surface area (including leakage oil adhered area 8) of the measurement object 7.

In STEP5, the image processing unit 5 invokes the preset area 11 (11a and 11b) without oil adhesion in any case and draws a characteristic line I=aS by the least square method, using the saturation and intensity of each pixel corresponding to the area 11 without oil adhesion in any case. Further, the image processing unit 5 calculates K defined in the equation 4. The characteristic line I=aS is applied even to an area 10 without oil adhesion on the surface of another object 7 to be measured.

Figure 6B:
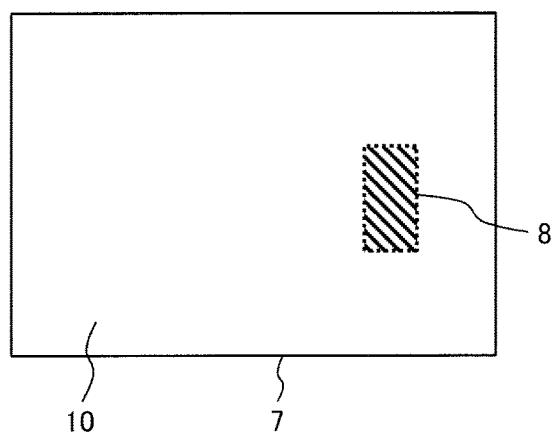
FIG. 6B is a schematic view showing the image processed in the embodiment 2 of the oil leakage detector of the present invention.

When K>0 here, a threshold value $I_1$ determined to be indicative of an oil leakage is invoked from the recording unit 4 in STEP6. In STEP7, an area corresponding to a pixel group 8A exceeding the threshold value $I_1$ in the direction in which the numeric value of intensity is large from the characteristic line I=aS, is determined to be the leakage oil adhered area 8. As shown hatched in FIG. 6B, a mark is put on the area corresponding to the image A.

On the other hand, when K<0, a threshold value $I_2$ determined to be indicative of an oil leakage is invoked from the recording unit 4 in STEP6'. In STEP7', an area corresponding to a pixel group 8A which falls below the threshold value $I_2$ in the direction in which the numeric value of intensity is small from the characteristic line I=aS, is determined to be the leakage oil adhered area 8. As shown hatched in FIG. 6B, a mark is put on the area corresponding to the image A.

In the present embodiment as described above, an automatic determination as to an oil leakage and its visualization can be achieved by the setting of the area 11 without oil adhesion in any case in advance and the use of the intensity threshold values $I_1$ and $I_2$ relative to the characteristic line I=aS as well as to obtain an effect similar to that in the embodiment 1.

Embodiment 3

Figure 7:
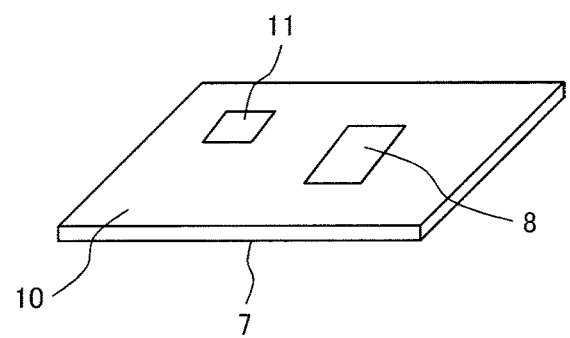
FIG. 7 is a perspective view showing an object to be measured adopted in an embodiment 3 of the oil leakage detector of the present invention.

FIG. 7 shows an object 7 to be measured adopted in an embodiment 3 of the oil leakage detector of the present invention. Incidentally, in the present embodiment, the same reference numerals are respectively attached to the same elements as in the embodiment 1, and the description thereof will be omitted. Only different parts will be described. Further, since the ultra-violet light 1, the color camera 2, the control unit 3, the recording unit 4, the image processing unit 5, and the display unit 6 are the same as those in the embodiment 1 shown in FIG. 1, their description will be omitted.

As shown in FIG. 7, an area 11 without oil adhesion in any case is set to the surface of the measurement object 7 in advance. It is desirable to set the area 11 to a larger area.

Figure 8:
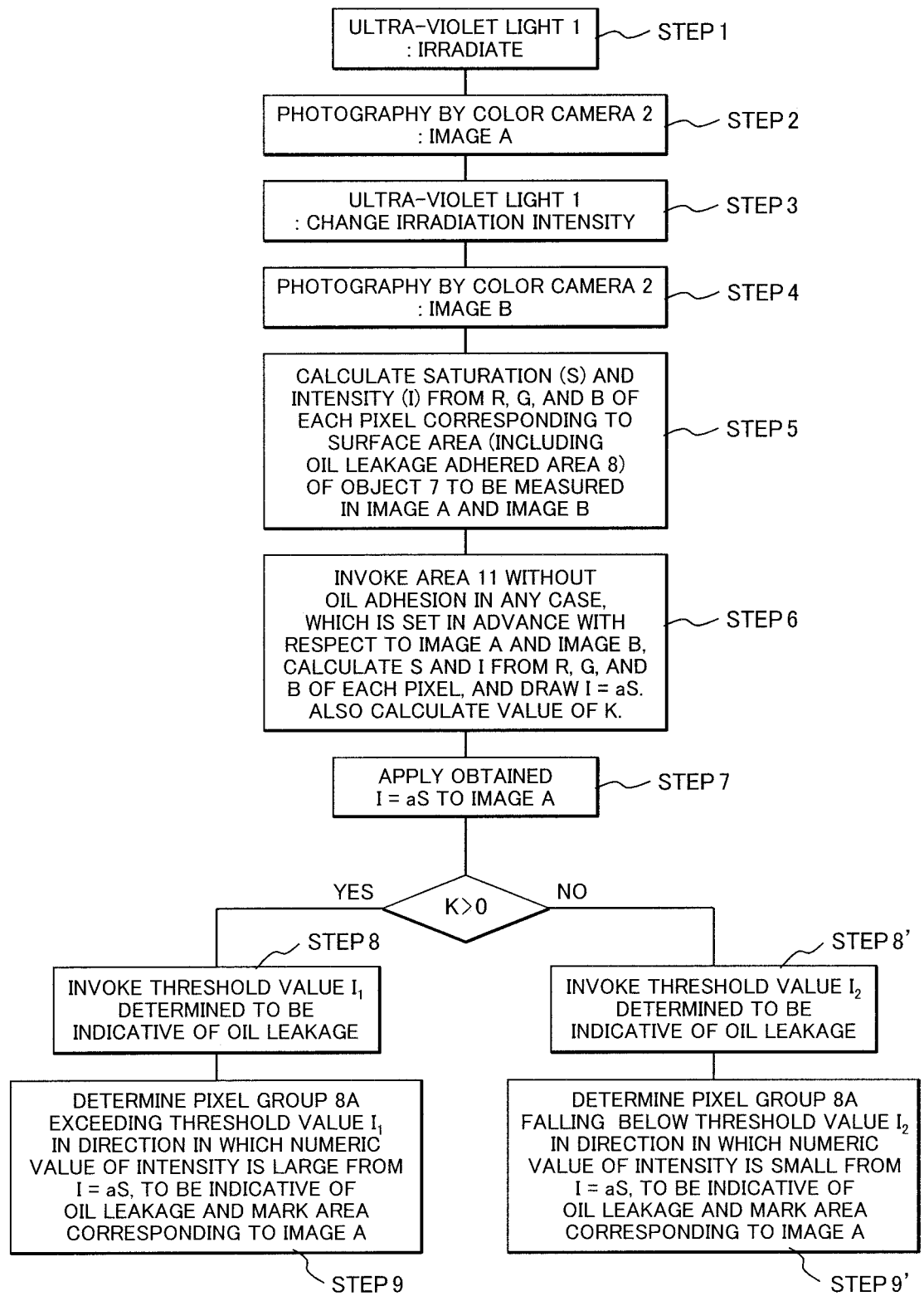
FIG. 8 is a flowchart for describing an oil leakage detecting operation in the embodiment 3 of the oil leakage detector of the present invention.

FIG. 8 is a flowchart when the oil leakage detector of the present embodiment automatically detects a leakage oil adhered area 8. The operation of the oil leakage detector of the present embodiment will be described in detail below using FIG. 8. Incidentally, since the operations from STEP1 to STEP2 are the same as those in the embodiment 2, they will be omitted.

As shown in FIG. 8, in STEP3, the irradiation intensity of the ultra-violet light 1 applied to the measurement object 7 is changed. With the change in the irradiation intensity of the ultra-violet light applied to the measurement object 7, changes in the saturation and intensity values due to changes in irradiation light of the point on the surface of the measurement object 7 described in the embodiment 1 and photographing angle relative to the color camera 2 are simulated.

An image B obtained by photography with the color camera 2 is stored in the recording unit 4 in STEP4. In STEP5, the saturation and intensity are calculated from R, G, and B of each pixel corresponding to the surface area (including leakage oil adhered area 8) of the measurement object 7 in each of the images A and B.

In STEP6, the preset area 11 without oil adhesion in any case is invoked from the recording unit, and the values of saturation and intensity of the area 11 without oil adhesion in any case, which are obtained from the images A and B are utilized to thereby draw a characteristic line I=aS. Further, K defined in the equation 4 is calculated. In STEP7, the characteristic line I=aS obtained in STEP6 is applied to the image A.

When K>0 here, a threshold value $I_1$ determined to be indicative of an oil leakage is invoked from the recording unit 4 in STEP8. In STEP9, an area corresponding to a pixel group 8A exceeding the threshold value $I_1$ in the direction in which the numeric value of intensity is large from the characteristic line I=aS, is determined to be the leakage oil adhered area 8. As shown hatched in FIG. 6B, a mark is put on the area corresponding to the image A.

On the other hand, when K<0, a threshold value $I_2$ determined to be indicative of an oil leakage is invoked from the recording unit 4 in STEP8'. In STEP9', an area corresponding to a pixel group 8A which falls below the threshold value $I_2$ in the direction in which the numeric value of intensity is small from the characteristic line I=aS, is determined to be the leakage oil adhered area 8. As shown hatched in FIG. 6B, a mark is put on the area corresponding to the image A.

In the present embodiment as described above, it is possible to improve diagnostic accuracy by determining the characteristic line I=aS using the saturation and intensity obtained where the different irradiation intensities are used with respect to the area 11 without oil adhesion in any case, as well as to obtain an effect similar to that in the embodiment 1.

Embodiment 4

Figure 9:
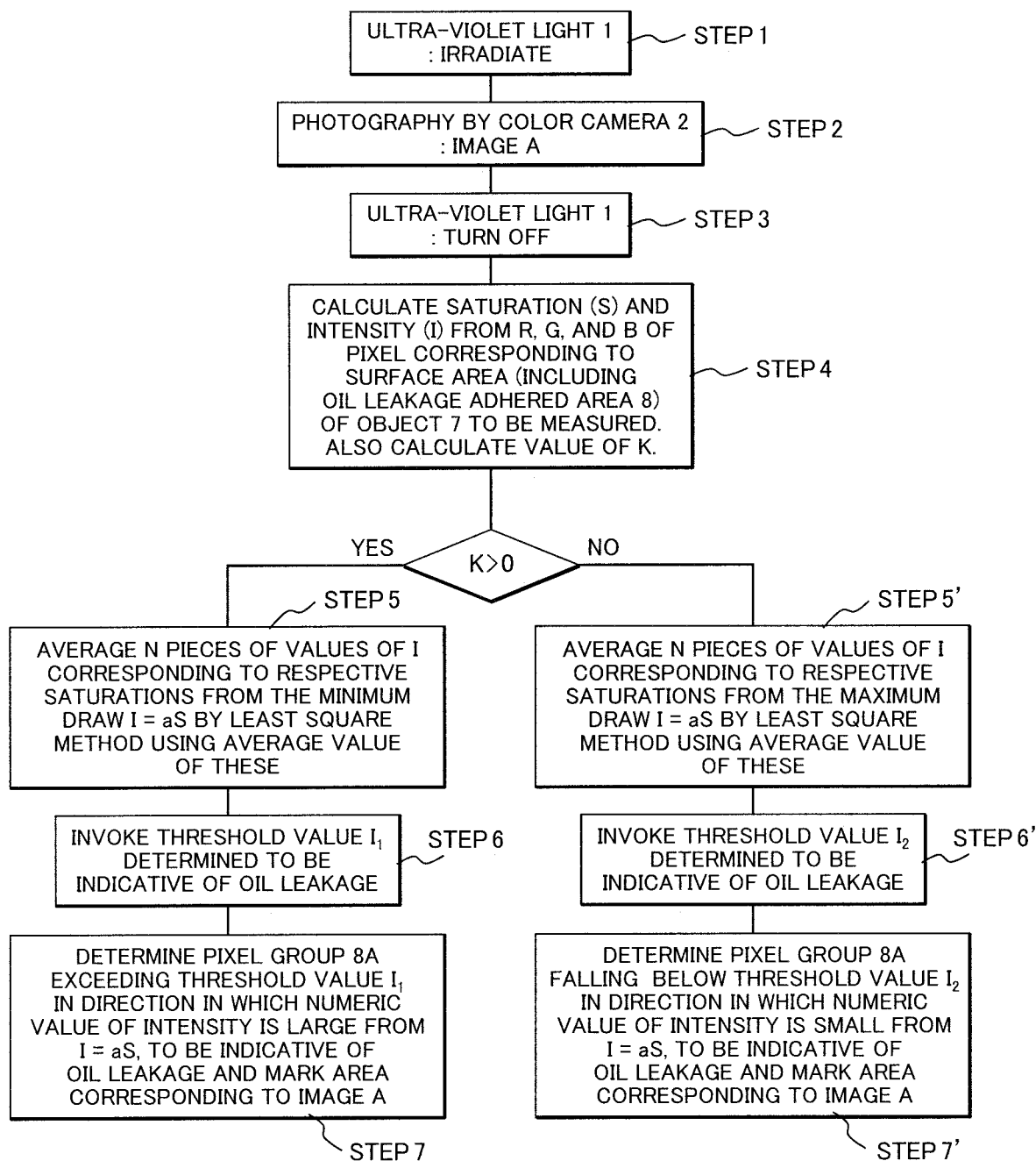
FIG. 9 is a flowchart for describing an oil leakage detecting operation in an embodiment 4 of the oil leakage detector of the present invention.

FIG. 9 is a flowchart for describing an oil leakage detecting operation in an embodiment 4 of the oil leakage detector of the present invention. Here, the same reference numerals are respectively attached to the same elements as in the embodiments 1 to 3, and the description thereof will be omitted. Only different parts will be described. Incidentally, since the operations other than in STEP5 are the same as in the embodiment 2, they will be omitted.

In the present embodiment illustrated in the drawing, when K>0, n pieces of intensity values corresponding to respective saturations are averaged from the minimum value in STEP5. A characteristic line I=aS is drawn from the so-obtained average value by the least square method. N>20 is preferred in order to enhance the accuracy of the saturation-intensity characteristic line I=aS of the area 10 without oil adhesion on the surface of the measurement object 7.

On the other hand, when K<0, n pieces of intensity values corresponding to respective saturations are averaged from the maximum value in STEP5. A characteristic line I=aS is drawn from the so-obtained average value by the least square method. N>20 is preferred in order to enhance the accuracy of the saturation-intensity characteristic line I=aS of the area 10 without oil adhesion on the surface of the measurement object 7.

In the present embodiment as described above, it is possible to calculate the characteristic line I=aS without providing the area 11 without oil adhesion in any case and achieve the simplification of a process as well as to obtain an effect similar to that in the embodiment 1.

Embodiment 5

Figure 10:
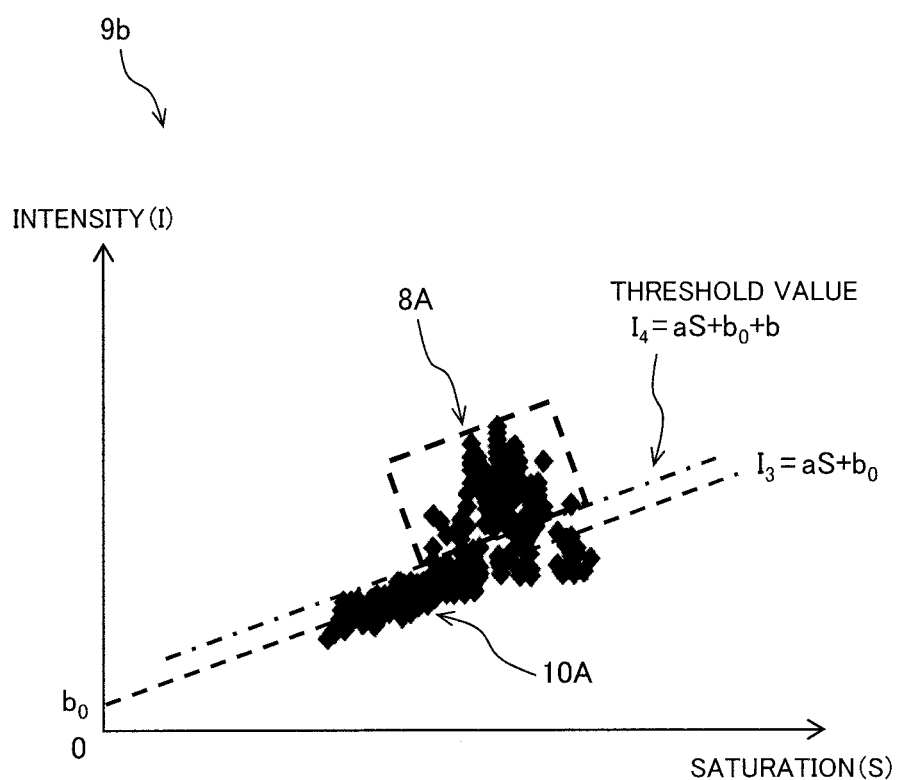
FIG. 10 is a view showing an intensity-saturation relationship of an oil leakage detection method in an embodiment 5 of the oil leakage detector of the present invention.

FIG. 10 shows an intensity-saturation graph $9b$ for oil leakage detection in an embodiment 5 of the oil leakage detector of the present invention. The intensity-saturation graph $9b$ shown in the drawing shows where K>0. Incidentally, here, the same reference numerals are respectively attached to the same elements as those in the embodiments 1 to 4, and the description thereof will be omitted. Only different parts will be described.

Although it has been described in the embodiments 1 to 4 that when the reflection of the area 10 without oil adhesion on the surface of the measurement object 7 is of diffusion reflection, the relationship between the saturation (S) and the intensity (I) ideally yields I=aS, the straight line does not actually necessarily pass through the origin of the intensity-saturation graph $9b$ due to the influence of the surface state of the measurement object 7 and the like. That is, there is a case where $b_0 \neq 0$ is reached under $I_3 = aS + b_0$.

In such a case, i.e., when K>0, the threshold value is set to $I_4 = aS + b_0 + b$. Further, when K<0, the threshold value is set to $I_5 = aS + b_0 + b'$.

In such a present embodiment, it is possible to perform oil leakage detection by setting the threshold value to $I_4 = aS + b_0 + b$ when the straight line does not actually necessarily pass through the origin of the intensity-saturation graph $9b$ due to the influence of the surface state of the measurement object 7 and the like, i.e., when K>0, and setting the threshold value to $I_5 = aS + b_0 + b'$ when K<0, as well as to obtain an effect similar to that in the embodiment 1.

Embodiment 6

Figure 11:
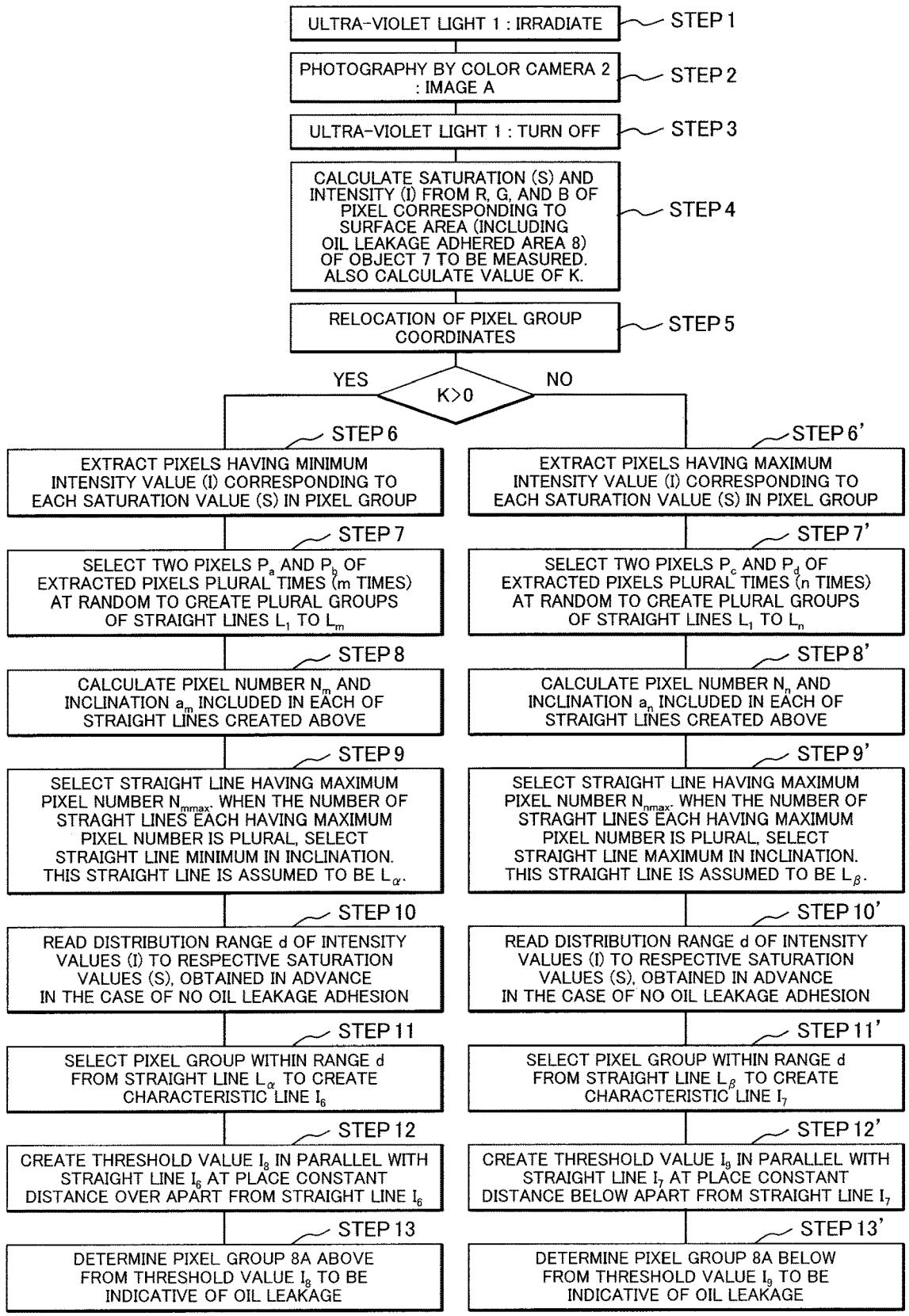
FIG. 11 is a flowchart for describing an oil leakage detecting operation in an embodiment 6 of the oil leakage detector of the present invention.

FIG. 11 is a flowchart for describing an oil leakage detecting operation in an embodiment 6 of the oil leakage detector of the present invention.

Figure 12:
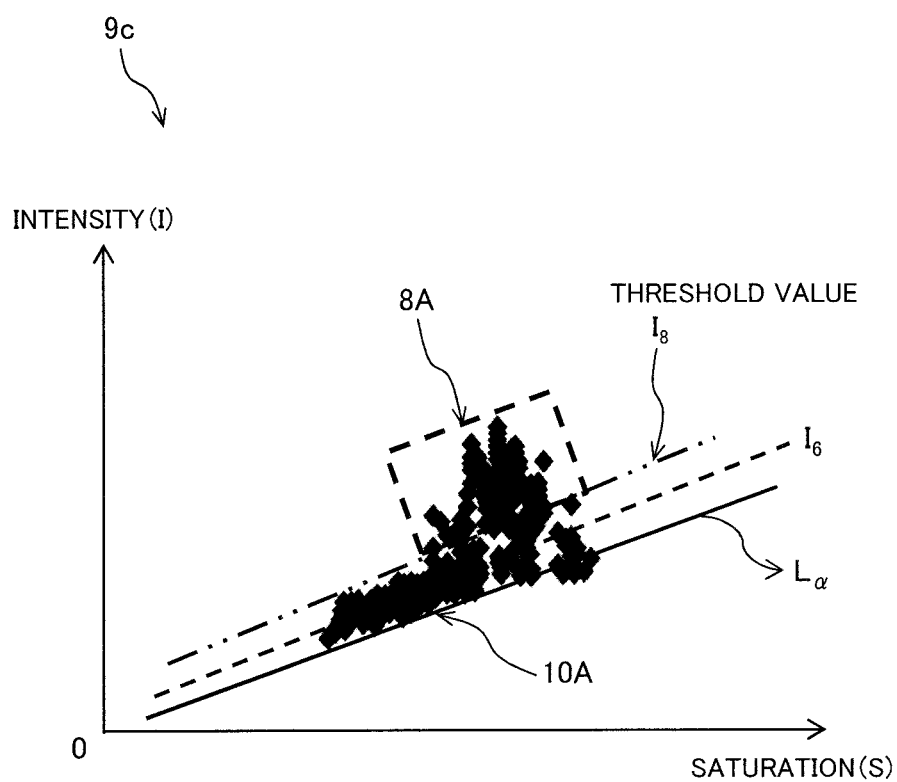
FIG. 12 is a view showing an intensity-saturation relationship of an oil leakage detection method in the embodiment 6 of the oil leakage detector of the present invention.

In the present embodiment, the same reference numerals are respectively attached to the same elements as those in the embodiments 1 to 5, and the description thereof will be omitted. Only different parts will be described. Further, since the control unit 3, the recording unit 4, the image processing unit 5, and the display unit 6 are the same as those in the embodiment 1 shown in FIG. 1, their description will be omitted. An intensity-saturation graph $9c$ illustrated in FIG. 12 shows where K>0. Incidentally, since the operations from STEP1 to STEP3 are the same as those in the embodiments 2 and 4, they will be omitted.

As shown in FIG. 11, in STEP4, the image processing unit 5 calculates the saturation and intensity from R, G, and B of each pixel of the surface area (including leakage oil adhered area 8) of the measurement object 7. Further, the image processing unit 5 calculates K defined in the equation 4.

Figure 13:
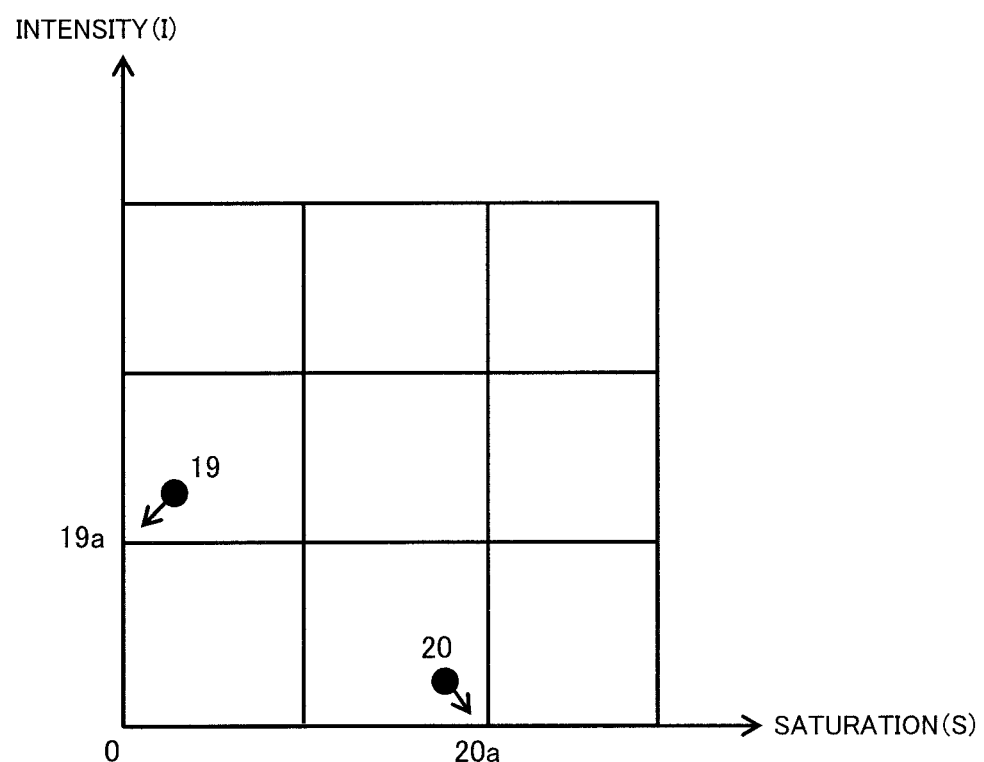
FIG. 13 is a schematic view for describing a method for relocating the coordinates of pixels in the embodiment 6 of the oil leakage detection method of the present invention.

Further, in STEP5, the coordinates of each pixel group are relocated. This relocating method is shown in FIG. 13.

As shown in the drawing, the minimum interval of each of the intensity and saturation values is defined, and an intensity-saturation space is divided in a grid shape. Each pixel is relocated to the closest grid point. For example, a pixel 19 is relocated to a grid point 19a, and a pixel 20 is relocated to a grid point 20a.

When K>0 here, a pixel group obtained by selecting a pixel having the minimum value of the intensity values corresponding to the respective saturations is represented as PG1 in STEP6.

On the other hand, when K<0, a pixel group obtained by selecting a pixel having the maximum value of the intensity values corresponding to the respective saturations is represented as PG2 in STEP6'.

When K>0 here, in STEP7, two pixels $P_a$ and $P_b$ are selected plural times at random with respect to the pixel group PG1 to create a plurality of straight line groups $L_1$ to $L_m$.

On the other hand, when K<0, in STEP7', two pixels $P_c$ and $P_d$ are selected plural times at random with respect to the pixel group PG2 to create a plurality of straight line groups $L_1$ to L.

When K>0 here, in STEP8, the numbers of pixels lying on the straight lines of the plural straight line groups $L_1$ to $L_m$ created in STEP7 are calculated. The number of pixels lying on the straight line of the straight line group $L_m$ is represented as $N_m$.

Figure 14A:
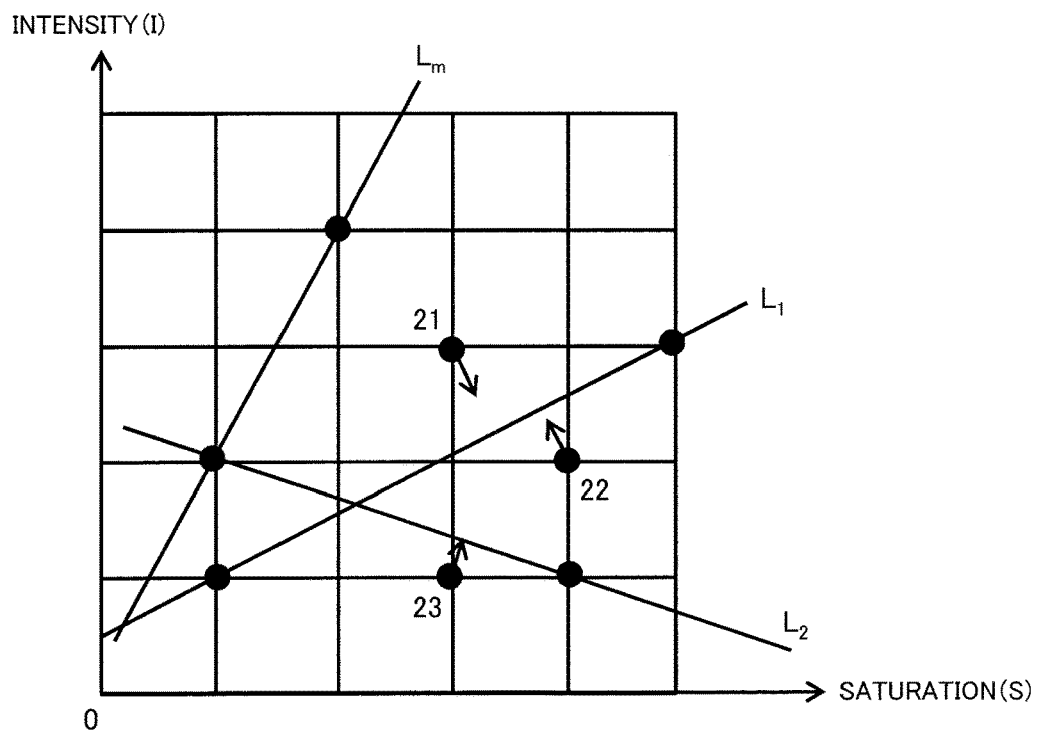
FIG. 14A is a schematic view for describing a method for calculating the number of pixel groups located on straight lines in the embodiment 6 of the oil leakage detection method of the present invention.

As a method for calculating the above-described pixel number $N_m$, the distances between all pixels of the pixel group PG1 and each of the straight line groups $L_1$ to $L_m$ are calculated as shown in FIG. 14A. Then, a straight line shortest in distance is selected and counted as pixels lying on the straight line. For example, a pixel 21 and a pixel 22 are counted as the pixels lying on the straight line group $L_1$, and a pixel 23 is counted as the pixel lying on the straight line group $L_2$.

Further, the inclinations of the respective straight lines are calculated. The inclination of the straight line group $L_m$ is represented as $a_m$.

On the other hand, when K<0, in STEP8', the numbers of pixels lying on the straight lines of the plural straight line groups $L_1$ to $L_n$ created in STEP7' are calculated. The number of pixels lying on the straight line of the straight line group $L_n$ is represented as $N_n$.

Figure 14B:
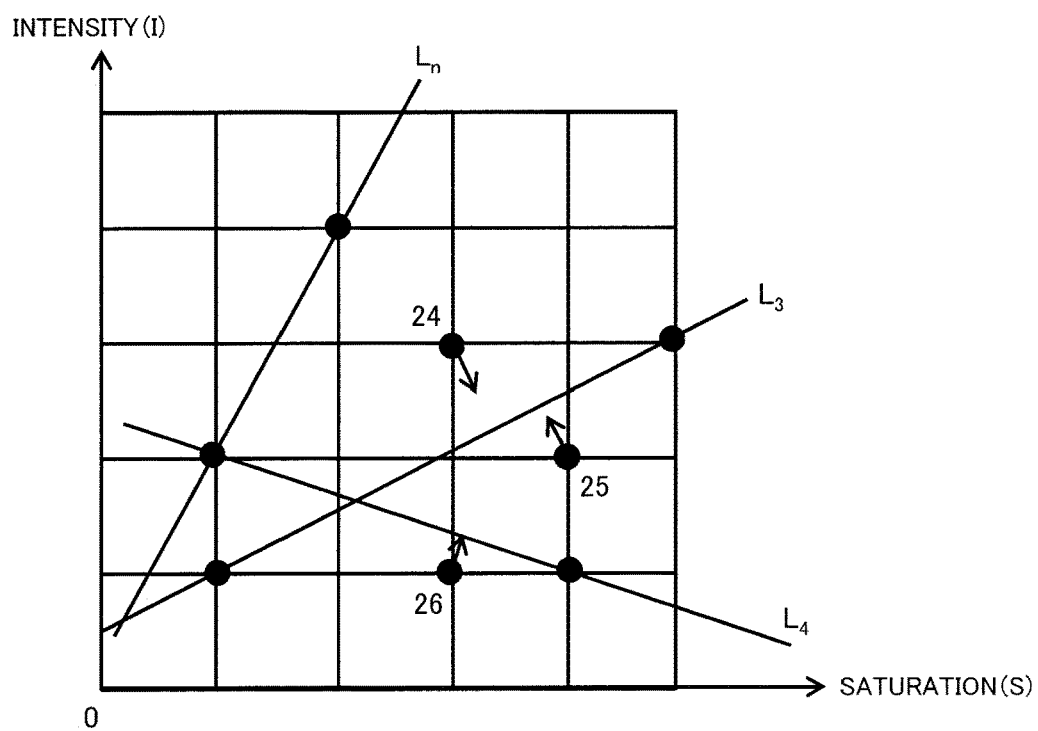
FIG. 14B is a typical view for describing a method for calculating the number of pixel groups located on straight lines in the embodiment 6 of the oil leakage detection method of the present invention.

As a method for calculating the above-described pixel number $N_n$, the distances between all pixels of the pixel group PG2 and each of the straight line groups $L_1$ to $L_n$ are calculated as shown in FIG. 14B. Then, a straight line shortest in distance is selected and counted as pixels lying on the straight line. For example, a pixel 24 and a pixel 25 are counted as the pixels lying on the straight line group $L_3$, and a pixel 26 is counted as the pixel lying on the straight line group $L_4$.

Further, the inclinations of the respective straight lines are calculated. The inclination of the straight line group $L_n$ is represented as $a_n$.

When K>0 here, a straight line having a maximum pixel number $N_{mmax}$ is selected in STEP9. When the number of straight lines having the maximum pixel number is plural, a straight line minimum in inclination is selected. This straight line is assumed to be $L_\alpha$.

On the other hand, when K<0, a straight line having a maximum pixel number $N_{nmax}$ is selected in STEP9'. When the number of straight lines having the maximum pixel number is plural, a straight line maximum in inclination is selected. This straight line is assumed to be $L_\beta$.

In STEPS10 and 10', a distribution range d of the values of intensity (I) on the surface of the measurement object 7 where the oil leakage is determined to be absent in advance is read from the recording unit regardless of K>0 or K<0.

Since the distribution range d of the intensity values to each saturation value is not necessarily constant, the distribution range d is given by, for example, taking the average value of distribution ranges of intensity values to all saturation values or taking the maximum distribution range excepting an abnormal width.

When K>0 here, in STEP11, a pixel group within a distance d is selected away from the straight line $L_\alpha$ in the directions in which the value of intensity is large and small, with the straight line $L_\alpha$ obtained in STEP9 as the reference. A straight line $I_6$ which fits most the selected pixel group is determined. As one example of a fitting method, there is mentioned a method of least square. The so-obtained straight line $I_6$ is considered to be the characteristic straight line of the area 10 without oil adhesion on the surface of the measurement object 7. The straight line $I_6$ does not always pass the origin of the intensity-saturation graph 9c depending to the surface state of the straight line $I_6$.

On the other hand, when K<0, in STEP11', a pixel group within a distance d is selected away from the straight line $L_\beta$ in the directions in which the value of intensity is large and small, with the straight line $L_\beta$ obtained in STEP9' as the reference. A straight line $I_7$ which fits most the selected pixel group is determined. As one example of a fitting method, there is mentioned a method of least square. The so-obtained straight line $I_7$ is considered to be the characteristic straight line of the area 10 without oil adhesion on the surface of the measurement object 7. The straight line $I_7$ does not always pass the origin of the intensity-saturation graph 9c depending to the surface state of the straight line $I_7$.

When K>0 here, in STEP12, a threshold value $I_8$ is created in parallel with the straight line $I_6$ at a place a constant distance D in the direction in which the value of intensity is large apart from the straight line $I_6$ obtained in STEP11. As one example of the magnitude of the distance D, the distance D is assumed to D=d/2, for example.

On the other hand, when K<0, in STEP12', a threshold value $I_9$ is created in parallel with the straight line $I_7$ at a place a constant distance D in the direction in which the value of intensity is small apart from the straight line $I_7$ obtained in STEP11'. As one example of the magnitude of the distance D, there is D=d/2, for example.

When K>0 here, in STEP13, a pixel group 8A exceeding the threshold value $I_8$ created in STEP12 in the direction in which the value of intensity is large, is determined to be indicative of an oil leakage.

On the other hand, when K<0, in STEP13', a pixel group 8A falling below the threshold value $I_9$ created in STEP12' in the direction in which the value of intensity is small, is determined to be indicative of an oil leakage.

With the provision of such a present embodiment, it is possible to, without complicating the device, automatically set a threshold value for determining an oil leakage and automatically detect an oil leakage with high accuracy and high sensitivity.

Incidentally, the present invention is not limited to the above embodiments and includes various modifications. The above embodiments are those described so as to facilitate the understanding of the present invention and are not necessarily limited to those provided with all the described configurations. Further, it is also possible to replace part of the configuration of an embodiment with the configuration of another embodiment. The configuration of another embodiment can also be added to the configuration of the embodiment. Furthermore, the addition, deletion and replacement of another configuration can also be performed on part of the configuration of each embodiment.

DESCRIPTION OF REFERENCE SIGNS

1 . . . ultra-violet light, 2 . . . color camera, 3 . . . control unit, 4 . . . recording unit, 5 . . . image processing unit, 6 . . . display unit, 7 . . . object to be measured, 8 . . . leakage oil adhered area, 8A, 10A . . . pixel group, 9a, 9b, 9c . . . intensity-saturation graph, 10 . . . area without oil adhesion on the surface of measurement object, 11, 11a, 11b . . . area without oil adhesion in any case, 14 . . . bushing, 15 . . . tank of transformer, 16 . . . radiator, 17a . . . upper pipe, 17b . . . bottom pipe, 18a, 18b . . . junction part (flange), 19, 19a, 20, 20a, 21, 22, 23, 24, 25, 26 . . . pixel, 100 . . . oil leakage detector.

What is claimed is:

1. An oil leakage detector comprising:
   an ultra-violet light irradiated on an object to be measured;
   a color camera which photographs fluorescence from the object irradiated with the ultra-violet light;
   a processing unit which determines an oil leakage by the image of the object photographed by the color camera; and
   a display unit which displays a result of determination by the processing unit, wherein
   the processing unit calculates the values of saturation and intensity, using the following expression:

$$\text{Saturation } (S) = \sqrt{R^2 + G^2 + B^2 - GR - BR - GB} \quad 1$$

$$\text{Intensity } (I) = \frac{1}{2}R + \frac{1}{2}G + \frac{1}{2}B \quad 2$$

where R=red, G=green, and B=blue for each pixel, in the color image photographed by the color camera, and determines the existence of an oil leak based on a relationship between the values of saturation and intensity and a threshold value.

2. The oil leakage detector according to claim 1, wherein means for determining the area corresponding to the pixel group to be the oil leakage adhered area in the processing unit draws an intensity-saturation characteristic line of the saturation expressed in an X-axis and the intensity expressed in a Y-axis and determines, based on the intensity-saturation characteristic line, an area corresponding to a pixel group exceeding the threshold value of the upper limit of intensity, to be an oil leakage adhered area where R (Red), G (Green), and B (Blue) of each pixel indicative of the surface of the object photographed by the color camera satisfies a condition of $R^2+G^2-BR-BG>0$, or determines, based on the intensity-saturation characteristic line, an area corresponding to a pixel group falling below the threshold value of the lower limit of intensity, to be an oil leakage adhered area where the R, G, and B of the area of the object satisfies a condition of $R^2+G^2-BR-BG<0$.

3. The oil leakage detector according to claim 2, wherein the processing unit draws the intensity-saturation characteristic line of the X-axis saturation and the Y-axis intensity by utilizing the area without oil adhesion on the surface of the object.

4. The oil leakage detector according to claim 2, wherein the processing unit draws the intensity-saturation characteristic line of the X-axis saturation and the Y-axis intensity by utilizing the values of saturation and intensity obtained when the ultra-violet light irradiates the area without oil adhesion on the surface of the object with light having different intensities.

5. The oil leakage detector according to claim 2, wherein the processing unit averages small values of intensity corresponding to each saturation where the R, G, and B of each pixel indicative of the surface of the object photographed by the color camera satisfies the condition of $R^2+G^2-BR-BG>0$, or averages large values of intensity corresponding to each saturation where the R, G, and B of each pixel indicative of the surface of the object photographed by the color camera satisfies the condition of $R^2+G^2-BR-BG<0$, and draws the intensity-saturation characteristic line of the X-axis saturation and the Y-axis intensity by using the average value of those.

6. The oil leakage detector according to claim 3, wherein the setting of the area without oil adhesion on the surface of the object in the processing unit comprises setting a plurality of areas away from each other or setting an area having an area of such a degree as to include the areas away from each other.

7. The oil leakage detector according to claim 2, wherein the area corresponding to the pixel group determined to be the oil leakage adhered area in the color image of the object is marked.

8. An oil leakage detection method comprising the steps of, when an oil leakage adhered area of an object to be measured is detected by an oil leakage detector including an ultra-violet light irradiated on the object, a color camera which photographs fluorescence from the object irradiated with the ultra-violet light, a processing unit which determines an oil leakage by the image of the object photographed by the color camera and a display unit which displays a result of determination by the processing unit:

calculating by the processing unit, the values of saturation and intensity in the color image photographed by the color camera for photographing the fluorescence from the object irradiated with the ultra-violet light;

determining the existence of an oil leak based on a relationship between the values of saturation and intensity and a threshold value, using the following expression:

$$\text{Saturation } (S) = \sqrt{R^2 + G^2 + B^2 - GR - BR - GB} \qquad 1$$

-continued $$\text{Intensity } (I) = \frac{1}{2}R + \frac{1}{2}G + \frac{1}{2}B \qquad 2$$

where R=red, G=green, and B=blue for each pixel.

9. The oil leakage detection method according to claim 8, wherein the determination of the area corresponding to the pixel group to be the oil leakage adhered area by the processing unit comprises drawing an intensity-saturation characteristic line of the saturation expressed in an X-axis and the intensity expressed in a Y-axis and determining, based on the intensity-saturation characteristic line, an area corresponding to a pixel group exceeding the threshold value of the upper limit of intensity, to be an oil leakage adhered area where R (Red), G (Green), and B (Blue) of each pixel indicative of the surface of the object photographed by the color camera satisfies a condition of $R^2+G^2-BR-BG>0$, or determining, based on the intensity-saturation characteristic line, an area corresponding to a pixel group falling below the threshold value of the lower limit of intensity, to be an oil leakage adhered area where the R, G, and B of the area of the object satisfies a condition of $R^2+G^2-BR-BG<0$.

10. The oil leakage detection method according to claim 9, comprising the step of drawing the intensity-saturation characteristic line of the X-axis saturation and the Y-axis intensity using the area without oil adhesion to the object.

11. The oil leakage detection method according to claim 9, comprising the step of drawing the intensity-saturation characteristic line of the X-axis saturation and the Y-axis intensity by utilizing the values of saturation and intensity obtained when the ultra-violet light irradiates the area without oil adhesion to the object with light having different intensities.

12. The oil leakage detection method according to claim 9, comprising the steps of averaging small values of intensity corresponding to each saturation where the R, G, and B of each pixel indicative of the surface of the object photographed by the color camera satisfies the condition of $R^2+G^2-BR-BG>0$, or averaging large values of intensity corresponding to each saturation where the R, G, and B of each pixel indicative of the surface of the object photographed by the color camera satisfies the condition of $R^2+G^2-BR-BG<0$, and drawing the saturation-intensity characteristic line of the X-axis saturation and the Y-axis intensity by using the average value of those.

13. The oil leakage detection method according to claim 10, wherein the setting of the area without oil adhesion to the object in the processing unit comprises setting a plurality of areas away from each other or setting an area having an area of such a degree as to include the areas away from each other.

14. The oil leakage detection method according to claim 9, comprising the step of marking the area in the color image corresponding to the pixel group determined to be the oil leakage adhered area of the object.

15. The oil leakage detection method according to claim 9, comprising the steps of: by the intensity-saturation characteristic line of the X-axis saturation and the Y-axis intensity, selecting the minimum value of the intensity values corresponding to the respective saturations, utilizing a pixel group obtained by the selection and a distribution range of the intensity values on the surface of the object, obtained in advance where leakage oil is not adhered, and drawing a characteristic line of a surface area without the oil adhesion, and further creating a threshold value line in parallel with the characteristic line at a place a constant distance in a direction in which the intensity value is large apart from the characteristic line, and determining an area corresponding to the pixel group lying in a direction in which the intensity value is large from threshold value line, to be an oil leakage adhered area;

or by the intensity-saturation characteristic line, selecting the maximum value of the intensity values corresponding to the respective saturations, utilizing a pixel group obtained by the selection and a distribution range of the intensity values by the surface of the object, obtained in advance where leakage oil is not adhered, and drawing a characteristic line of a surface area without oil adhesion, and further creating the threshold value line in parallel with the characteristic line at a place a constant distance in a direction in which the intensity value is small apart from the characteristic line, and determining an area corresponding to the pixel group lying in a direction in which the intensity value is small from threshold value line, to be an oil leakage adhered area.

16. The oil leakage detection method according to claim 15, comprising the steps of selecting the minimum or maximum value of the intensity values, selecting two pixels plural times at random with respect to a pixel group obtained by the selection to create a plurality of straight line groups, and creating a straight line having the maximum value of a number including the selected pixels, and the minimum or maximum value of an inclination.

17. The oil leakage detection method according to claim 16, wherein the selection of the minimum value of the intensity values comprises defining the minimum interval of each axis for intensity and saturation with respect to coordinates of each pixel group, dividing an intensity-saturation graph, and relocating each pixel using a redefined coordinate to select a pixel after redefinition of the coordinate.

18. The oil leakage detection method according to claim 16, wherein the calculation of the number of pixels when the straight line having the maximum value of the number including the selected pixels is selected, comprises calculating distances between all the pixels in the selected pixel group and respective straight lines therefor to thereby select the straight line shortest in distance, and calculating each pixel on the corresponding straight line.

19. The oil leakage detection method according to claim 15, comprising the step of, as the distribution range of the intensity values of the area without oil adhesion on the surface of the object, utilizing a distribution range obtained in advance where leakage oil is not adhered to the surface of the object.

20. An image processing unit, wherein the image processing unit receives a color image photographed by a color camera which photographs fluorescence from an object to be measured irradiated with an ultra-violet light, calculates values of saturation and intensity in the color image, and determines the existence of an oil leak based on a relationship between values of saturation and intensity and a threshold value, using the following expression:

$$\text{Saturation }(S) = \sqrt{R^2 + G^2 + B^2 - GR - BR - GB} \qquad 1$$

$$\text{Intensity }(I) = \frac{1}{2}R + \frac{1}{2}G + \frac{1}{2}B \qquad 2$$

where R=red, G=green, and B=blue for each pixel.

* * * * *